US010578949B2

(12) United States Patent
Coughenour

(10) Patent No.: US 10,578,949 B2
(45) Date of Patent: Mar. 3, 2020

(54) ASYMMETRIC ZONES IN A FRESNEL LENS

(71) Applicant: Apple Inc., Cupertino, CA (US)

(72) Inventor: Blake M. Coughenour, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 5 days.

(21) Appl. No.: 15/884,233

(22) Filed: Jan. 30, 2018

(65) Prior Publication Data

US 2018/0224715 A1  Aug. 9, 2018

Related U.S. Application Data

(60) Provisional application No. 62/454,679, filed on Feb. 3, 2017.

(51) Int. Cl.
| | | |
|---|---|---|
| G03B 15/05 | (2006.01) | |
| F21V 23/04 | (2006.01) | |
| G02B 3/08 | (2006.01) | |
| F21V 5/04 | (2006.01) | |

(52) U.S. Cl.
CPC ............ *G03B 15/05* (2013.01); *F21V 5/045* (2013.01); *F21V 23/0442* (2013.01); *G02B 3/08* (2013.01); *G03B 2215/0503* (2013.01)

(58) Field of Classification Search
CPC ..... F21V 5/045; F21V 23/0442; G03B 15/05; G03B 2215/0592; G03B 2215/0503; G02B 19/0014; G02B 19/0061; G02B 3/08
USPC ........................................ 359/642, 741, 742
See application file for complete search history.

(56) References Cited

U.S. PATENT DOCUMENTS

| | | | |
|---|---|---|---|
| 5,617,163 | A | 4/1997 | Ohtake |
| 5,742,438 | A | 4/1998 | Conner et al. |
| 5,852,751 | A | 12/1998 | Kawabata et al. |
| 7,581,854 | B2 | 9/2009 | Ford |
| 8,163,580 | B2 | 4/2012 | Daschner et al. |
| 2005/0041307 | A1 | 2/2005 | Barone |
| 2010/0014274 | A1 | 1/2010 | Shyu et al. |
| 2013/0155691 | A1 | 6/2013 | Hsieh |
| 2014/0003456 | A1 | 1/2014 | Mikliaev et al. |
| 2015/0016119 | A1 | 1/2015 | Inada et al. |
| 2016/0223157 | A1 | 8/2016 | Saito |
| 2016/0356457 | A1 | 12/2016 | Wang |

FOREIGN PATENT DOCUMENTS

JP        201424223       2/2014

OTHER PUBLICATIONS

International Search Report and Written Opinion from PCT/US2018/016264, dated May 14, 2018, Apple Inc., pp. 1-13.
Invitation to Respond to Written Opinion from Singapore Application No. 10201800925X, dated Aug. 10, 2018, Apple Inc., pp. 1-11.

*Primary Examiner* — Tuyen Tra
(74) *Attorney, Agent, or Firm* — Robert C. Kowert; Kowert, Hood, Munyon, Rankin & Goetzel, P.C.

(57) ABSTRACT

A Fresnel lens includes multiple different zones. At least one of the zones may be an asymmetric zone that is radially asymmetric. The asymmetric zone may redirect light received from a light source located within a focal length of the Fresnel lens to a portion of a field of view of an image sensor. In some embodiments, multiple asymmetric zones may be implemented within the same Fresnel lens, which may have different radial asymmetry.

20 Claims, 11 Drawing Sheets

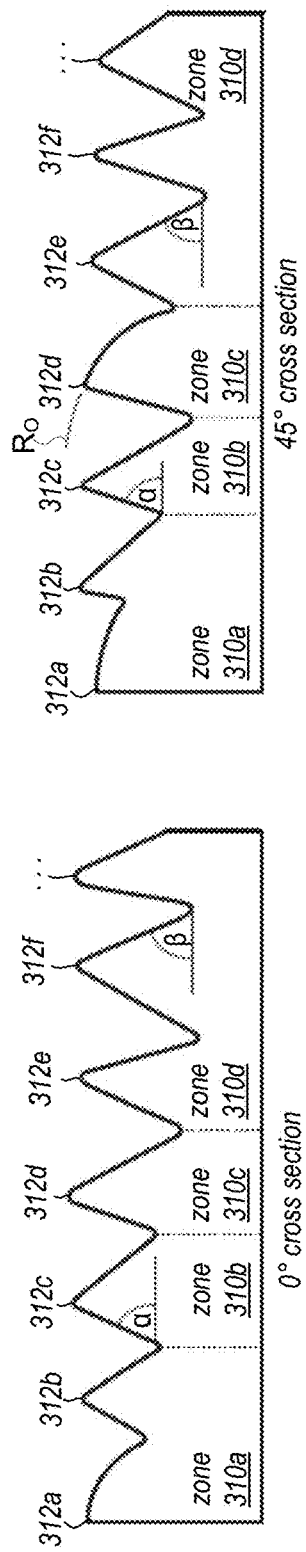

| Zone Type | Zone | Sub-Zone | Angle α for 0° cross section | Angle α for 45° cross section | Angle β for 0° cross section | Angle β for 45° cross section | Radius $R_O$ for 0° cross section | Radius $R_O$ for 45° cross section |
|---|---|---|---|---|---|---|---|---|
| symmetric | 310a | 312a | - | - | - | - | $γ_{312a}$ | $γ_{312a}$ |
| symmetric | 310a | 312b | $α_{312b}$ | $α_{312b}$ | $β_{312b}$ | $β_{312b}$ | $γ_{312b}$ | $γ_{312b}$ |
| asymmetric | 310b | 312c | $α_{312c}$ | $α_{312c}$ | $β_{312c}$ | $β_{312c} + δ_{312c}$ | $γ_{312c}$ | $γ_{312c} - ζ_{312c}$ |
| asymmetric | 310c | 312d | $α_{312d}$ | $α_{312d}$ | $β_{312d}$ | $β_{312d} - δ_{312d}$ | $γ_{312d}$ | $γ_{312d} - ζ_{312d}$ |
| asymmetric | 310d | 312e | $α_{312e}$ | $α_{312e}$ | $β_{312e}$ | $β_{312e} - δ_{312e}$ | $γ_{312e}$ | $γ_{312e} - ζ_{312e}$ |
| symmetric | 310d | 312f | $α_{312f}$ | $α_{312f}$ | $β_{312f}$ | $β_{312f}$ | $γ_{312f}$ | $γ_{312f}$ |
| symmetric | 310a | 312a | - | - | - | - | $γ_{312a}$ | $γ_{312a}$ |
| symmetric | 310a | 312b | $α_{312b}$ | $α_{312b}$ | $β_{312b}$ | $β_{312b}$ | $γ_{312b}$ | $γ_{312b}$ |
| asymmetric | 310b | 312c | $α_{312c}$ | $α_{312c} + δ_{312c}$ | $β_{312c}$ | $β_{312c}$ | $γ_{312c}$ | $γ_{312c} - ζ_{312c}$ |
| asymmetric | 310c | 312d | $α_{312d}$ | $α_{312d} - δ_{312d}$ | $β_{312d}$ | $β_{312d}$ | $γ_{312d}$ | $γ_{312d} - ζ_{312d}$ |
| asymmetric | 310d | 312e | $α_{312e}$ | $α_{312e} - δ_{312e}$ | $β_{312e}$ | $β_{312e}$ | $γ_{312e}$ | $γ_{312e} - ζ_{312e}$ |
| symmetric | 310d | 312f | $α_{312f}$ | $α_{312f}$ | $β_{312f}$ | $β_{312f}$ | $γ_{312f}$ | $γ_{312f}$ |

(first group: α angle fixed; second group: β angle fixed)

FIG. 3C

ASYMMETRIC ZONES IN A FRESNEL LENS

RELATED APPLICATIONS

This application claims benefit of priority to U.S. Provisional Application Ser. No. 62/454,679, entitled "ASYMMETRIC ZONES IN A FRESNEL LENS," filed Feb. 3, 2017, and which is incorporated herein by reference in its entirety.

BACKGROUND

When capturing image data using an image sensor or other image capture device, such as a camera, it is common to include a flash, strobe, or other component that uses an illumination element, such as a light emitting diode (LED), that emits light to illuminate portions of a scene located within a field of view of the image sensor. As image sensors are often embedded in a wide variety of devices, different types of flash components may be implemented to suit the constraints or design requirements of the different devices that include the image sensors. For example, mobile computing devices, such as mobile phones or other portable multi-function devices, may implement image sensors and flash components that occupy a limited portion of the mobile computing device, leaving space for other elements or components of the mobile computing device to provide other functions or capabilities. Therefore, techniques to reduce the space or resources occupied by flash components or image sensors may be desirable.

In various embodiments, a Fresnel lens may be implemented to illuminate a scene or other portion within the field of view of an image sensor, directing light received from an illumination element or other light source into the field of view. The Fresnel lens may include multiple different zones for directing received light. While one or more of the zones in the Fresnel lens may be radially symmetric, another one or more of the zones may be asymmetric, resulting in a zone that is radially asymmetric. The asymmetric zone may provide localized redirection of light so that different portions of the asymmetric zone direct light differently. One embodiment of an asymmetric zone may, for instance, redirect light to provide inverted illumination in the field of view, while another embodiment of an asymmetric zone may redirect light to provide a non-inverted illumination in the field of view. Different combinations of multiple asymmetric zones may be implemented within a single Fresnel lens or multiple Fresnel lenses implemented together as part of a same light source module.

BRIEF DESCRIPTION OF THE DRAWINGS

FIGS. 3A-3C illustrates example cross sections of different asymmetric zones of a Fresnel lens, according to some embodiments.

Figure 1:
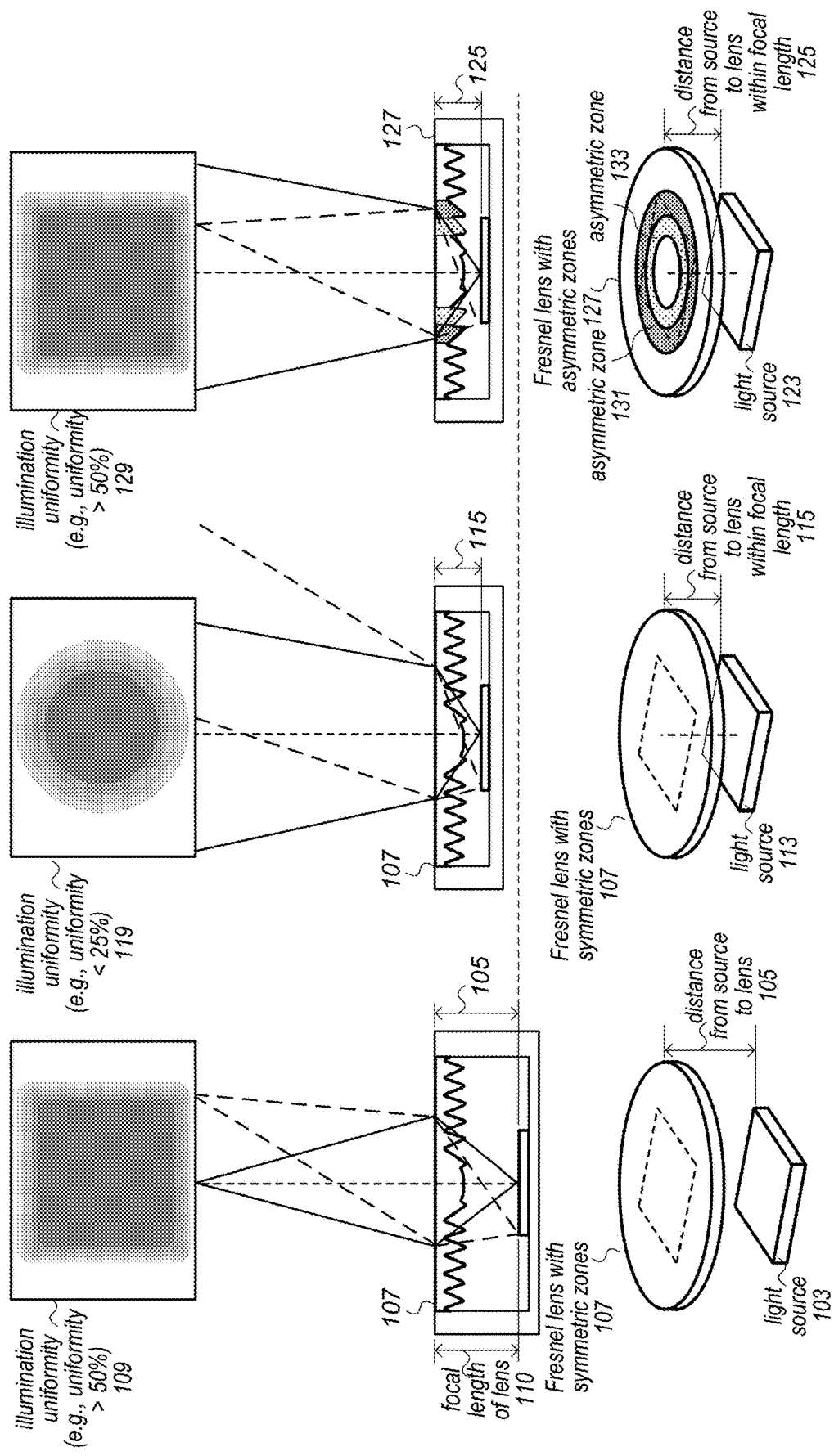
FIGS. 1A-1C illustrate different optical systems that include different Fresnel lenses and light source placements, including a Fresnel lens with an asymmetric zone, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Various embodiments may implement an asymmetric zone in a Fresnel lens. In order to capture image data for an event, object, or other scene in the field of view of an image sensor, additional light may be focused or otherwise directed into the field of view. In this way, deficiencies or characteristics of natural or other lighting may be balanced, counteracted, or otherwise compensated for within the field of view. To direct light into the field of view, different types of lenses or reflectors may be implemented to receive and redirect light into the field of view. For example, a total internal reflective (TIR) lens or a curved reflector may redirect and concentrate received light into a particular direction, pattern, or location within the field of view.

A Fresnel lens may be implemented, in various embodiments, to receive light emitted from a light source, in order to redirect the light into a field of view of an image sensor. A Fresnel lens may implement multiple zones. Each zone may include one or more sub-zones. A sub-zone may include one or more segments or surface elements (e.g., ridges, "teeth", grooves, or other features, like prisms) that redirect light in order to illuminate different or the same portions of a field of view for the image sensor. Each sub-zone within a same zone may share one or more characteristics across the zone. For example, the type of sub-zone, symmetric or asymmetric, may be shared by two sub-zones in a same zone (as discussed below in FIGS. 3A-3C). Sub-zones may also have different characteristics within a same zone. For instance, a zone may include two asymmetric sub-zones each with different forms of asymmetry (e.g., different surface measurements at different locations in the zone) or a zone may include both an asymmetric sub-zone and symmetric sub-zone.

A sub-zone may be described in different ways. A "tooth" segment, such as the "teeth" segments illustrated in FIGS. 1-4, may be defined by an α angle with respect to an inner surface (with respect to the center of the Fresnel lens) of the segment, a β angle with respect to an outer surface (with respect to the center of the Fresnel lens) of the segment, and a surface radius $R_O$ for the outer surface. The inner surface and outer surface of the segment may be joined together at a "peak" of the "tooth." Note that other measurements may be used to describe a segment. The radius $R_I$ for the inner surface may also be described, as can the height of the peak or length of a surface, in various embodiments. Sub-zones may adjoin one another. In the "tooth" example given above, the outer surface of one "tooth" may join the inner surface of an adjacent "tooth" as a "valley" between the "peaks" of the "teeth." In some embodiments, a sub-zone may not traverse the entire circumference around the center of a lens, as illustrated in FIG. 4 for example.

Different zones (or sub-zones) of the Fresnel lens may receive light from the light source at different angles (e.g., because of a 180° spread from a light source). The zones may then collimate the light from the different angles so that the light is redirected out from the Fresnel lens in parallel directions. Typically, a Fresnel lens may implement zones that include symmetric zones with symmetric sub-zones and/or segments in order to redirect received light from a light source into space. For example, as illustrated in FIG. 1A, light source 103 may emit light that is received at Fresnel lens with symmetric zones 107 and redirected to provide an illumination pattern 109 in object space. In such an implementation, light source 103 is placed at distance from the Fresnel lens 107 that is equivalent to a focal length 110 of Fresnel lens 107, which may achieve an illumination uniformity of greater than 50%. Such illumination uniformity may be highly desirable in order to provide uniform effect to balance, counteract, or compensate for other light sources captured in the field of view.

A focal length of a Fresnel lens, such as Fresnel lens 107 may be determined in different ways. In some embodiments the focal length may be specified for the entire Fresnel lens and applicable to each sub-zone of the Fresnel lens. In some embodiments, the focal length of the Fresnel lens may be specific to individual zones, sub-zones, or any other segments or surfaces of the Fresnel lens. Thus different zones, sub-zones, or any other segments or surfaces of the same Fresnel lens may have different focal lengths.

In order to reduce the space occupied by the optical system providing illumination, the height of the optical system can be reduced, moving the light source closer to the Fresnel lens. For example, FIG. 1B illustrates an optical system where light source 113 has a distance 115 from the same Fresnel lens with symmetric zones 107 that is less than focal length 110 for Fresnel lens 107 (which may be less than the focal length distance of the Fresnel lens overall or less than the focal length distance of any one (or more) zones, sub-zones, segments or other surfaces of Fresnel lens 107). In such a scenario, some of the light received from source 113 may be redirected outside of the field of view (as illustrated by the dash lines coming from lens 107), resulting in an illumination uniformity 119 that is less uniform (e.g., less than 25% uniformity). In this example, the space savings achieved by shortening the height of the optical system, resulting in illumination performance that is inferior to the optical system of greater height, depicted in FIG. 1A.

In order to achieve space savings without losing illumination performance, a Fresnel lens with one or more asymmetric zones may be implemented, in various embodiments. For example, in FIG. 1C, Fresnel lens 127 includes asymmetric zones 131 and 133. These asymmetric zones may provide localized surfaces that are radially asymmetric, such as the asymmetric surfaces discussed below with regard to FIGS. 2-4. Thus, the surface at one location in the zone (e.g., the surface of a zone along a radius of 45° of the Fresnel lens) may different than the surface at another location in the same zone (e.g., the surface of the zone at a radius of 90° of the Fresnel lens). Asymmetric zones allow for Fresnel lens 127 to redirect light received at the asymmetric zone from a light source 123 that is a distance 125 within the focal length 110 back within the field of view, negating some or all of the negative effects of placing the light source 123 in a location that is out of focus with respect to Fresnel lens 127 (e.g., light that would otherwise be directed out of the field of view given the location of light source 123, such as is depicted in FIG. 1B). In this way, asymmetric zones 131 and 133 may be combined with symmetric zones in Fresnel lens 127 to implement an optical system that provides an illumination uniformity 129 (e.g., greater than 50%) that is similar, comparable, or better than the illumination uniformity of an optical system with an in-focus light source (e.g., illumination uniformity 109), while retaining the shorter optical system height. An optical system with a shorter height can allow systems, components, or devices, such as a mobile computing device, that embed or implement the optical system to provide illumination for an image sensor to be thinner without sacrificing illumination performance.

Figure 2:
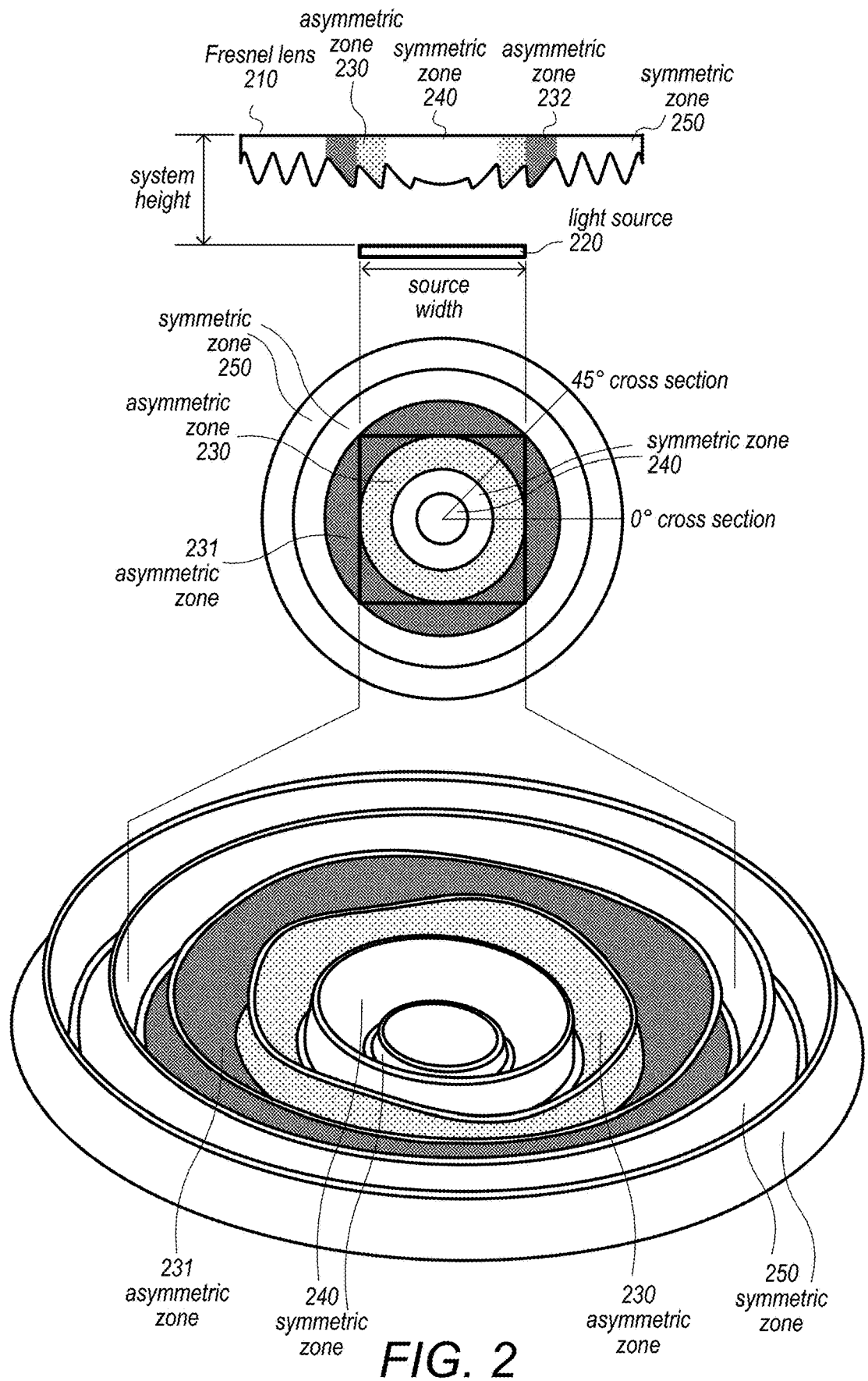
FIG. 2 illustrates a Fresnel lens that includes an asymmetric zone, according to some embodiments.
Figure 3A:
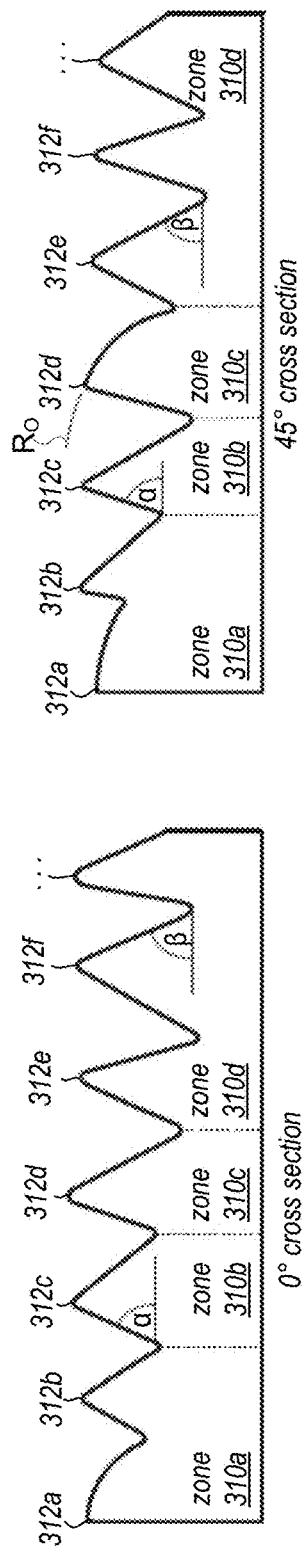

FIG. 2 illustrates a Fresnel lens that includes multiple asymmetric zones, according to some embodiments. Fresnel lens 210 implements multiple zones, including asymmetric zone 230 and symmetric zone 240. The selection and placement of asymmetric zones 230 and 231 and symmetric zones 240 may be relative to the shape and distance of light source 220 from Fresnel lens 210 (as determined by the desired optical system height). For example, some zones may be placed fully within the dimensions of a light source so that the outer boundaries of the zone do not extend beyond the light source edges, such as symmetric zone 240 and asymmetric zone 230. In such cases, a zone may be placed so that the zone is inscribed within the light source dimensions so that the outer boundaries of the zone is tangent with one or more light source edges, such as asymmetric zone 230. Zones may also be placed in order to partially overlap with light source dimensions so that at least some portion of the zone is within the light source edges, such as asymmetric zone 231. Partial overlap may be implemented within different ways. For example, as depicted in FIG. 2, asymmetric zone 231 may include an outer boundary that is fully outside of the edges of the light source and an inner boundary that is fully within the edges of the light source. Alternatively, in other embodiments, a zone could include an outer boundary that is fully outside of the edges of the light source and an inner boundary that is partially within the edges of the light source, or a zone could include an outer boundary that is partially outside of the edges of the light source and an inner boundary that is fully within the edges of the light source. Zones may also be placed such that the boundaries of the zone are fully outside of the light source edges, such as symmetric zone 250.

The selection, arrangement, and characteristics of zones in a Fresnel lens may be varied in order to provide a desired illumination pattern or uniformity when the light source is within a focal length of the Fresnel lens. The implementation of one zone may guide the implementation of another zone. The arrangement of symmetric zones and the way in which light is directed by the symmetric zone may illuminate certain portions of a field of view, and thus may determine the selection, arrangement, and characteristics of one or more asymmetric zones in the Fresnel lens, in order to illuminate other portions in the field of view to achieve a desired illumination pattern or uniformity. Zones that invert light to cross over the center of the Fresnel lens, for instance, may be combined with other zones that are non-inverting so that light does not cross over the center of the Fresnel lens, as discussed in detail below with regard to FIG. 4. Zones that include a central region of the Fresnel lens may strongly influence the illumination pattern (e.g., a circular illumination pattern) so that one or more zones that are outside of the central region may compensate to create a different illumination pattern (e.g., a square illumination pattern). For example, the larger the diameter of the central region, the greater the amount of light is directed by the central region, which would increase the amount of compensation to be provided by asymmetric zones outside of the central region in order to modify the illumination pattern.

Although depicted as square, light source 220 could be implemented in non-square shapes (e.g., rectangular, circular, etc.) so that the boundaries of different zones within, overlapping, or outside of light source 220 may change. Thus, the illustration of a light source or selection of asymmetric or symmetric zones within Fresnel lens 210 is illustrative, and not intended to be limiting. The size and/or shape of light source 220 may also guide the implementation of different zones. For instance, the size of the light source may determine the size of asymmetric zones (as the size of the asymmetric zones may be increased to compensate for the increased size of the light source), which may also determine the size of a central region of the Fresnel lens. Similarly the shape of the light source may determine the shape of the Fresnel lens (e.g., a rectangular light source may be focused using oval shaped segments in a Fresnel lens or a circular light source may be focused using square shaped segments in a Fresnel lens). Note also that, in some embodiments, the height of the optical system may be dependent on the shape of light source 220. For example, system height may be less than the source width of light source 220.

In at least some embodiments, the implementation of asymmetric zones, such as asymmetric zone 230 or 231, may be implemented according to a sinusoidal pattern so that the variations in asymmetric zone surfaces may be periodic. For example, a rotational diamond tooling path for shaping a lens segment that can oscillate in a direction (e.g., Z-axis) while rotating along a circumference of the center of the Fresnel lens can be used to generate a sinusoidal pattern on a surface that may complete the pattern every 90°. In this way, a cross section of the lens at 0° including asymmetric zones 230 and 231 would be different than a cross section of the lens at 45° including zone 230 and 231, as discussed below with regard to FIGS. 3A-3C. However, in some embodiments, asymmetry may have no pattern or varying patterns (e.g., different magnitudes in variation, portions of the zone that have a pattern followed by portions of the same zone with no pattern).

The surfaces of an asymmetric zone may be implemented in different ways in order to achieve the redirection of light to different portions of a field of view. FIG. 3A illustrates example cross sections of different asymmetric zones of a Fresnel lens, according to some embodiments. Zones (e.g., zones 310a, 310b, 310c, and 310d) of different types (e.g., asymmetric, symmetric, or heterogeneous (not illustrated)) may be depicted at a 0° cross section and a 45° cross section. Some zones may include multiple sub-zones, such as zone 310a which includes sub-zones 312a and 312b, and zone 310d which includes sub-zones 312e, 312f, and so on, while other zones may include only a single sub-zone, such as zone 310b which includes sub-zone 312c and zone 310c which includes sub-zone 312d.

Different features of the sub-zones may be described in order to define the changes to the zone surface that may occur in asymmetric zones, in some embodiments. For example, as discussed previously and illustrated in FIG. 3A, each sub-zone may be defined by three different values, $\alpha$ angle with respect to an inner surface of the sub-zone (with respect to a center of the Fresnel lens, which is represented by zone 310a), in some embodiments. The inner surface may, in some embodiments, act as refractive surface. The sub-zone may also be described by a $\beta$ angle with respect to an outer surface of the sub-zone (with respect to a center of the Fresnel lens). The outer surface may, in some embodiments, act as a TIR surface. The outer surface may also be described by a surface radius $R_O$. In other embodiments, a different combination of the same or different measurements may be implemented, such as the height of sub-zones surfaces (not illustrated).

As noted in the charts accompanying the cross sections, free form zones may be described by the different angles and other measures for the sub-zone at the cross section degree (like the 0° and 45° cross sections illustrated in the top view of Fresnel lens 210 in FIG. 2). For example, in one example in FIG. 3A, the $\alpha$ angle is illustrated as fixed from one cross section to another, while sub-zone 312c may have a $\beta$ angle for a surface that changes from $\beta_{312c}$ at 0° cross section to $\beta_{312c} + \delta_{312c}$ at 45° (where $\delta$ represents the change in the angle), and in sub-zone 312d, $\beta$ angle changes from $\beta_{312d}$ at 0° cross section to $\beta_{312d} - \delta_{312d}$ at 45°. Note that a different sub-zone may have a different asymmetry. For instance, sub-zone 312d is also depicted as having a change in surface radius value from $\Upsilon_{312d}$ at 0° cross section to $\Upsilon_{312d} - \zeta_{312d}$ at 45° (where $\zeta$ represents the change in the angle). In another example illustrated in FIG. 3A, the β angle is illustrated as fixed from one cross section to another, while sub-zone 312c may have an α angle for a surface that changes from $\alpha_{312c}$ at 0° cross section to $\alpha_{312c}+\delta_{312c}$ at 45°, and in sub-zone 312d, α angle changes from $\alpha_{312d}$ at 0° cross section to $\alpha_{312d}-\delta_{312d}$ at 45° (along with a change in surface radius value from $\Upsilon_{312d}$ at 0° cross section to $\Upsilon_{312d}-\zeta_{312d}$ at 45°.

Figure 3B:
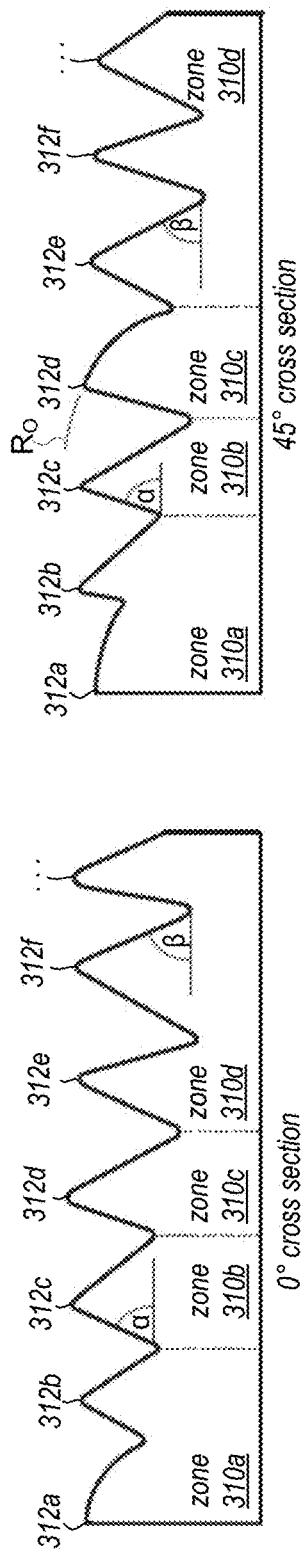
Figure 4:
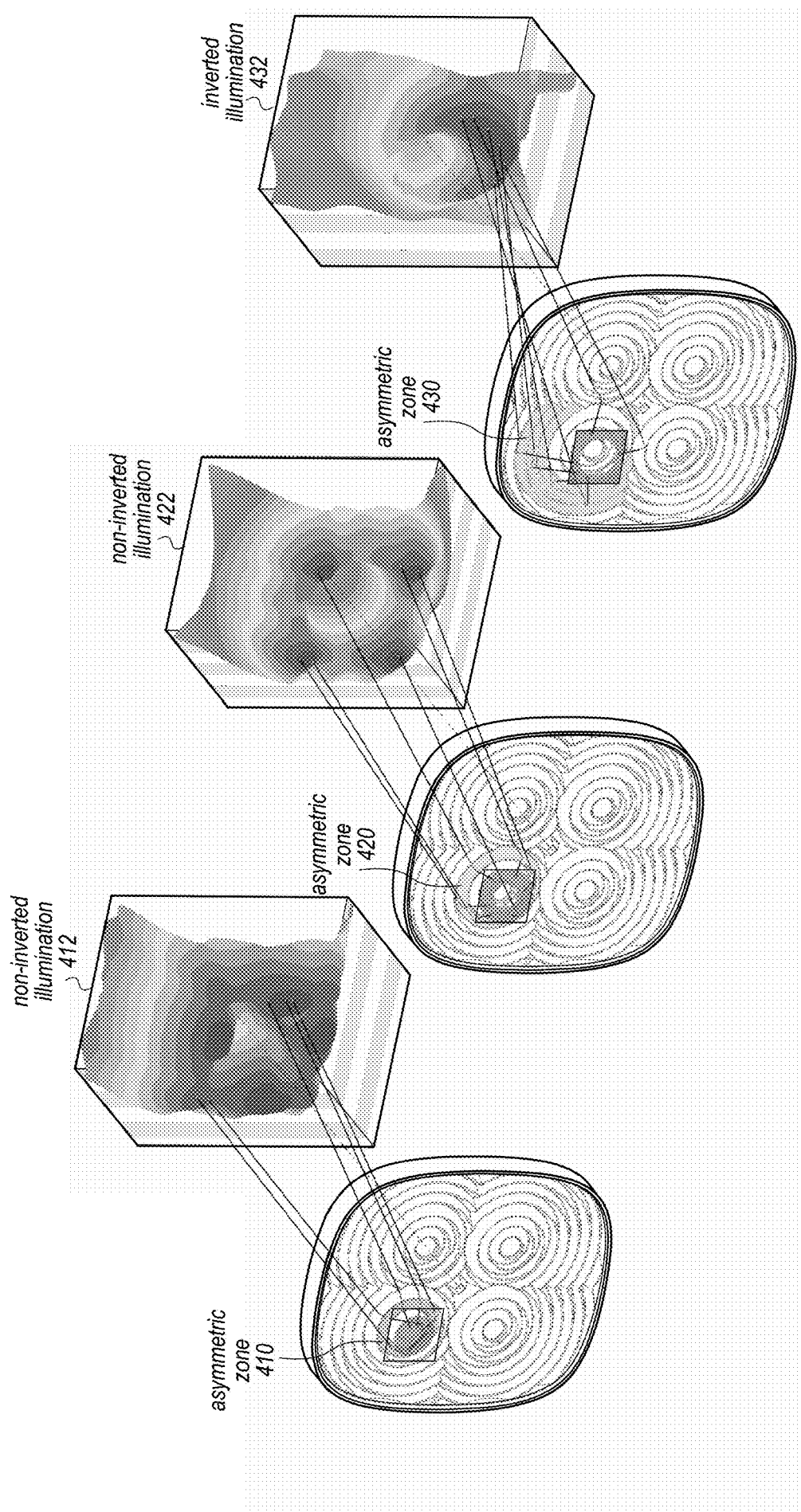
FIG. 4 illustrates a Fresnel lens with multiple asymmetric zones that redirect light to different portions of a field of view, according to some embodiments.

FIG. 3B illustrates other examples of cross sections of different asymmetric zones of a Fresnel lens, according to some embodiments. In one example, the α angle is illustrated as fixed from one cross section to another, while sub-zone 312c may have a β angle for a surface that changes from $\beta_{312c}$ at 0° cross section to $\beta_{312c}+\delta_{312c}$ at 45°, in sub-zone 312d, where the β angle changes from $\beta_{312d}$ at 0° cross section to $\beta_{312d}-\delta_{312d}$ at 45° (along with a change in surface radius value from $\Upsilon_{312d}$ at 0° cross section to $\Upsilon_{312d}-\zeta_{312d}$ at 45°), and in subzone 312e, where the β angle changes from $\beta_{312e}$ at 0° cross section to $\beta_{312e}-\delta_{312e}$ at 45°. In another example illustrated in FIG. 3B, the β angle is illustrated as fixed from one cross section to another, while sub-zone 312c may have an α angle for a surface that changes from $\alpha_{312c}$ at 0° cross section to $\alpha_{312c}+\delta_{312c}$ at 45°, in sub-zone 312d, α angle changes from $\alpha_{312a}$ at 0° cross section to $\alpha_{312d}-\delta_{312d}$ at 45° (along with a change in surface radius value from $\Upsilon_{312d}$ at 0° cross section to $\Upsilon_{312d}-\zeta_{312d}$ at 45°), and in sub-zone 312e, α angle changes from $\alpha_{312e}$ at 0° cross section to $\alpha_{312e}-\delta_{312e}$ at 45°.

FIG. 3C illustrates another example of cross sections of different asymmetric zones of a Fresnel lens, according to some embodiments. In one example illustrated in FIG. 3C, the α angle is illustrated as fixed from one cross section to another, while sub-zone 312c may have a β angle for a surface that changes from $\beta_{312c}$ at 0° cross section to $\beta_{312c}+\delta_{312c}$ at 45° and a surface radius $R_O$ that changes from $\Upsilon_{312c}$ at 0° cross section to $\Upsilon_{312c}-\zeta_{312c}$ at 45°. Sub-zone 312d may have a β angle for a surface that changes from $\beta_{312d}$ at 0° cross section to $\beta_{312d}-\delta_{312d}$ at 45° and a surface radius $R_O$ that changes from $\Upsilon_{312d}$ at 0° cross section to $\Upsilon_{312d}-\zeta_{312d}$ at 45°. Sub-zone 312e may have a β angle for a surface that changes from $\beta_{312e}$ at 0° cross section to $\beta_{312e}-\delta_{312e}$ at 45° and a surface radius $R_O$ that changes from $\Upsilon_{312e}$ at 0° cross section to $\Upsilon_{312e}-\zeta_{312e}$ at 45°. In another example illustrated in FIG. 3C, the β angle is illustrated as fixed from one cross section to another, while sub-zone 312c may have an α angle for a surface that changes from $\alpha_{312c}$ at 0° cross section to $\alpha_{312c}+\delta_{312c}$ at 45° and a surface radius $R_O$ that changes from $\Upsilon_{312c}$ at 0° cross section to $\Upsilon_{312c}-\zeta_{312c}$ at 45°. In sub-zone 312d, α angle changes from $\alpha_{312d}$ at 0° cross section to $\alpha_{312d}-\delta_{312d}$ at 45° and a surface radius $R_O$ changes from $\Upsilon_{312d}$ at 0° cross section to $\Upsilon_{312d}-\zeta_{312d}$ at 45°, and in sub-zone 312e, α angle changes from $\alpha_{312e}$ at 0° cross section to $\alpha_{312}-\delta_{312e}$ at 45° and a surface radius $R_O$ changes from $\Upsilon_{312e}$ at 0° cross section to $\Upsilon_{312e}-\zeta_{312e}$ at 45°.

Please note that illustrated measures and changes described for asymmetric zones as discussed above with regard to FIGS. 3A-3C are merely illustrations of possible changes to implement radial asymmetry in an asymmetric zone and are not intended to be limiting. For example, instead of changing β angle values, α angle values may be changed or both α and β angle values may be changed. In some embodiments, each degree (or portion of a degree) of the lens in a zone (e.g., from 0° to 359°) may be individually and/or custom defined, while in other embodiments a sinusoidal, periodic, or other repeating pattern, function, or description may be used to define the changes to surfaces in the zone. In this way, different portions of a zone or sub-zone may provide different characteristics for redirecting light.

Different sub-zones may have different forms of radial asymmetry within a zone. For example, one sub-zone may implement a sinusoidal pattern of asymmetry while an adjacent sub-zone may implement a non-patterned form of asymmetry. The same pattern of asymmetry may be implemented by different sub-zones at different locations within a zone. For instance, the same sinusoidal pattern may be implemented at two different subzones so that at any cross section of the sub-zones, the phase of the pattern is different. Such differences between asymmetric zones or subzones may redirect light in different ways. For example, FIG. 4 illustrates a Fresnel lens with multiple asymmetric zones that redirect light to different portions of a field of view, according to some embodiments. Asymmetric zone 410 may be implemented with different characteristics to direct light to different outer portions in object space. The redirection of the light may provide non-inverted illumination 412 (which may not redirect light across the center of the object space). In the same Fresnel lens, asymmetric zone 420 may provide another form of non-inverted illumination 422 (e.g., redirecting light to the different corners of the object space). In another asymmetric zone in the same Fresnel lens, asymmetric zone 430 may redirect light to provide an inverted illumination 432 (which may redirect light across the center of the object space to a common portion of the object space). The combined redirection of light from the different asymmetric zones (e.g., as well as other symmetric zones) may enhance the uniformity of the illumination provided in object space.

As depicted in FIG. 4 (and FIG. 5 discussed below) multiple Fresnel lenses may be combined with different characteristics of zones or sub-zones according to the placement of the Fresnel lens with respect to other Fresnel lenses. In these and other scenarios, different subzones of the lens may not traverse the entire circumference around the center of a lens (as illustrated in FIG. 4) but may still be radially asymmetric with respect to the center of the lens according to the various techniques discussed above, in some embodiments. Moreover, the placement of different types of sub-zones within a larger zone may share one common characteristic (e.g., a fixed surface radius $R_O$) but differ in terms of radial asymmetry (e.g., a symmetric sub-zone may be adjacent to an asymmetric sub-zone). Different combinations, orderings, and arrangements of one or more Fresnel lenses that utilize radial asymmetry and/or zones (or sub-zones) within the Fresnel lenses may offer many different possible illumination patterns, and thus previous examples are not intended to be limiting.

Figure 5:
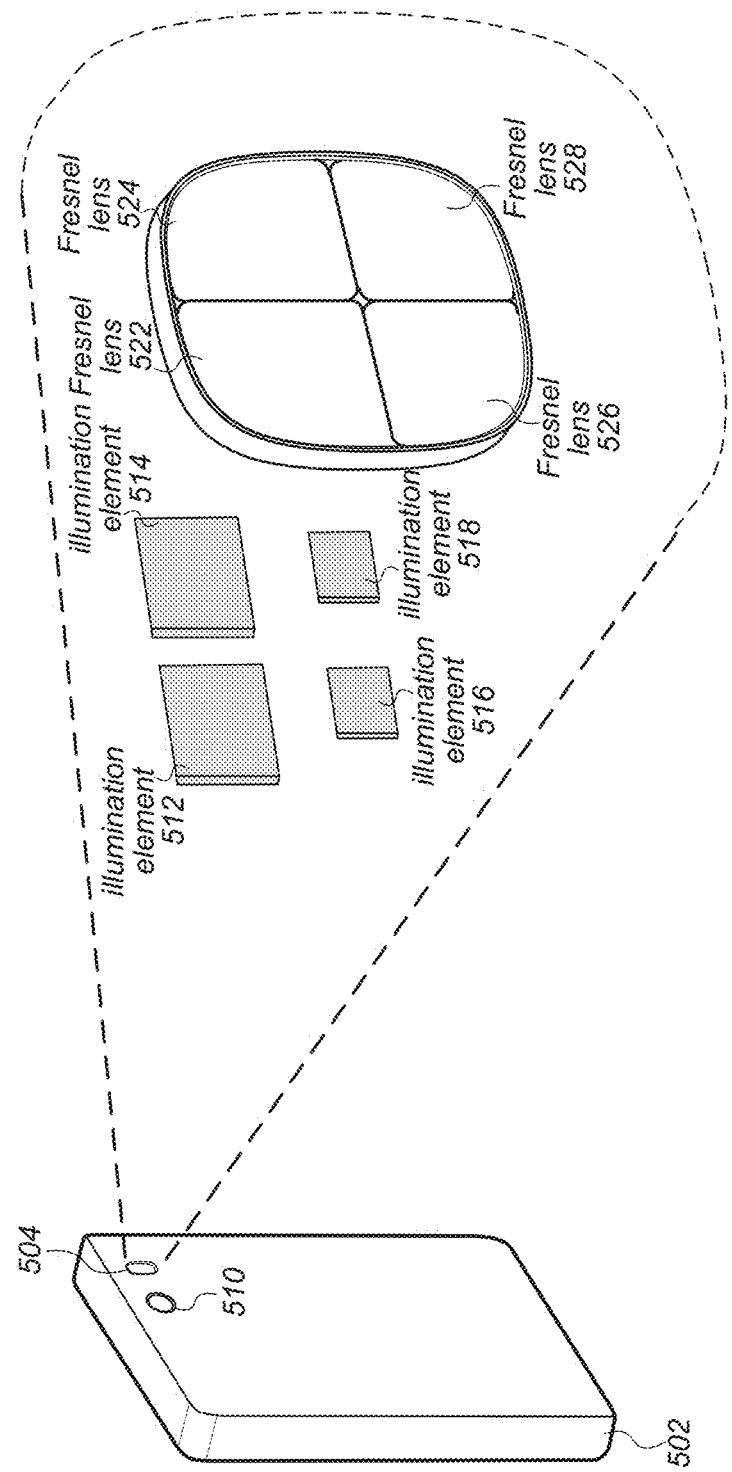
FIG. 5 illustrates a mobile computing device that implements an embedded light module that includes a Fresnel lens with asymmetric zone(s) and provides illumination for an image sensor, according to some embodiments.

FIG. 5 illustrates a mobile computing device that implements an embedded light module that provides illumination for an image sensor, according to some embodiments. Mobile device 502 may be a mobile phone, personal digital assistant, laptop, notebook, netbook computer, handheld computer, consumer device, video game console, handheld video game device, media playback device, storage device, or other computing device, such as portable multifunction device 700 discussed below with regard to FIGS. 7A-7C. Image sensor 510 may include one or multiple image sensor devices (e.g., cameras). For example, image sensor 510 may include a wide-angle camera, telephoto camera, both wide-angle camera and telephoto camera, or a hybrid camera that is configured to operate in both a wide-angle and telephoto mode.

Light source module 504 may be the same as light source module 604 discussed below with regard to FIG. 6 and may be controlled by a controller, such as controller 602. Light source module 504 includes one or multiple illumination elements, such as illumination elements 512, 5 7, 516, and 518, which may be the same or different type of illumination element (e.g., such as a light emitting diode (LED) or laser diode), and which may be the same or different shape (e.g., square, rectangle, circle, etc.) and/or size of shape (e.g., different size rectangles) and provide the same or different illumination patterns.

Light source module 504 may include one or multiple Fresnel lenses, such as Fresnel lens 522, 524, 526, and 528 that are implemented to receive light from a corresponding one of the illumination elements. These Fresnel lenses may be implemented in single package, in some embodiments, so that the concentric features, zones, or elements, may account for the redirection properties of other features, zones, or elements on other lenses. For example, Fresnel lens 522 may include asymmetric zones that redirect light to illuminate portions in a field of view that are not illuminated by Fresnel lens 524 or Fresnel lens 526. Moreover, each Fresnel lens may implement different numbers and/or types of zones (e.g., asymmetric or symmetric) and sub-zones, with different types of radial asymmetry for the asymmetric zones (e.g., surfaces varied according to the different measures discussed above with regard to FIGS. 3A-3C).

Mobile computing device 502 may utilize light source module 504 to enhance the image data captured by image sensor 510. For example, in order to illuminate a dark scene, an illumination element may be directed to emit light. The intensity of light emitted by the light source module may be changed or different illumination elements utilized in order to take advantage of the different illumination effects provided by different asymmetric Fresnel lenses in the light source module, in some embodiments. For example, a controller may receive lighting information from a camera or a light sensor and select different illumination elements (thus utilizing the corresponding Fresnel lens of the selected illumination element) according to lighting conditions in a field of view of a camera associated with a light source module. In such an example, the image sensor may provide image sensitivity settings, camera ISO settings, shutter speed settings, etc. to a controller so that the controller can make such a determination about which illumination elements (or the intensity of the light emitted from the illumination elements) to select in order to better illuminate a scene based on the received lighting condition information.

Figure 6:
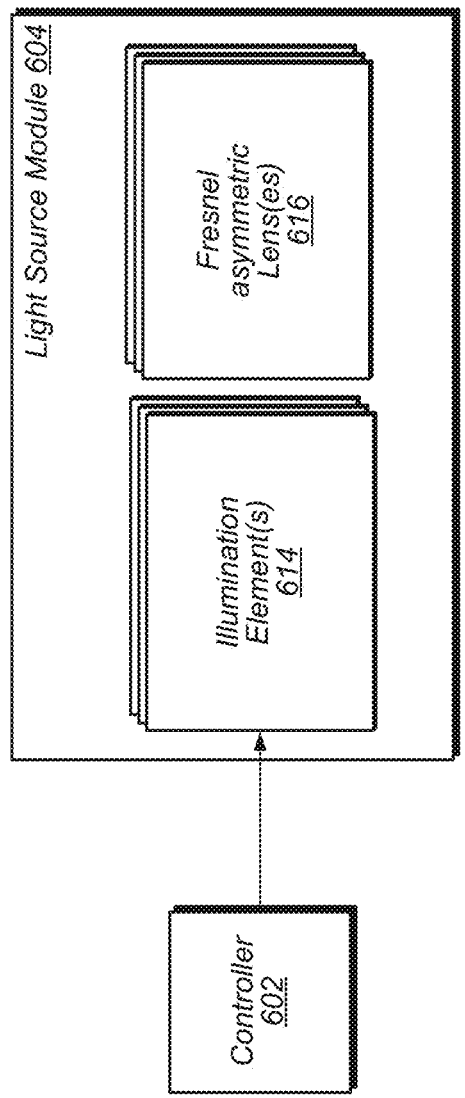
FIG. 6 illustrates a logical block diagram of a controller and light source module, according to some embodiments.

FIG. 6 illustrates a logical block diagram of a controller and light source module, according to some embodiments. A controller, such as controller 602, may receive lighting information from an image sensor, a command from a host system, or other information to determine which illumination element(s) 614 to instruct to emit light. Controller 602 may, for instance, receive a command indicating that particular setting has been selected for capturing image data (e.g., a scene type), and thus may determine which illumination elements are to be used corresponding to the selected scene type. In another example, controller 602 may analyze lighting information to determine the intensity of light to emit from one or more illumination elements 614. Controller 602 may be implemented in hardware and/or in software. In some embodiments, controller 602 may be implemented by one or more processors and memory of a mobile device, such as processors 720 and memory 702 of portable multifunction device 700 as discussed below with regard to FIG. 7C. Controller 602 may send one or more signals to a light source module 604, that includes illumination element(s) 614 and Fresnel lens(es) 616, to instruct illumination element(s) 614 to emit light which may then be received by Fresnel lens(es) 616 and focused into a space external to light source module 604.

Embodiments of electronic devices in which embodiments of light source modules, image sensors, etc. as described herein may be used, user interfaces for such devices, and associated processes for using such devices are described. As noted above, in some embodiments, light source modules, image sensors, and controllers, etc. can be included in a mobile computing device which can include a camera device. In some embodiments, the device is a portable communications device, such as a mobile telephone, that also contains other functions, such as PDA and/or music player functions. Other portable electronic devices, such as laptops, cell phones, pad devices, or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera device.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use one or more common physical user-interface devices, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with cameras. FIG. 7B is a block diagram illustrating portable multifunction device 700 with camera 770 in accordance with some embodiments. FIG. 7B illustrates camera 770, which is sometimes called an "optical sensor" for convenience, and may also be known as or called an optical sensor system. In addition, multifunction device 700 includes optical sensor 764 illustrated in FIG. 7A on an opposite side of multifunction device 700 from camera 770.

Figure 7A:
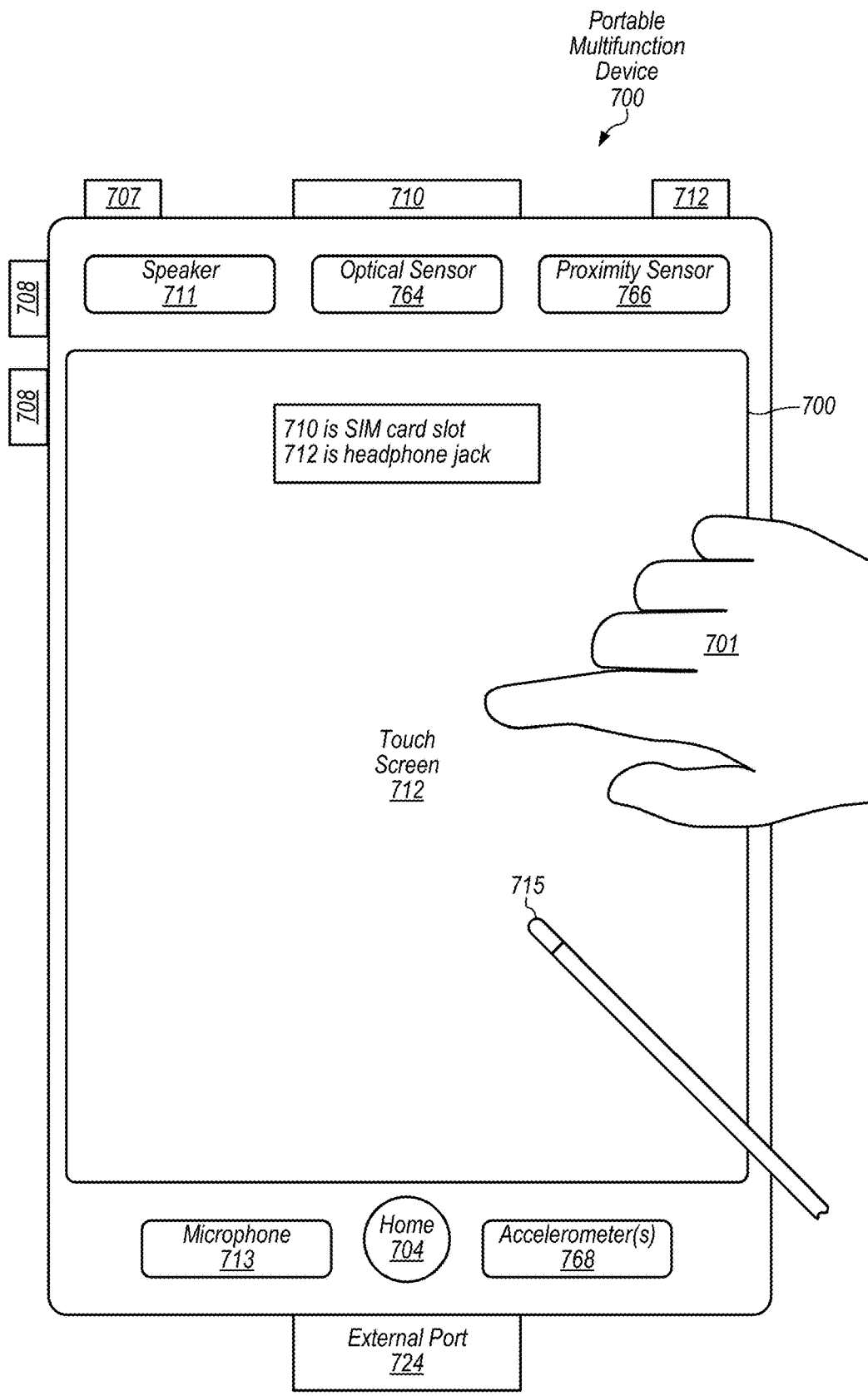
FIGS. 7A-7C illustrate a portable multifunction device with an embedded light source module, according to some embodiments.
Figure 7B:
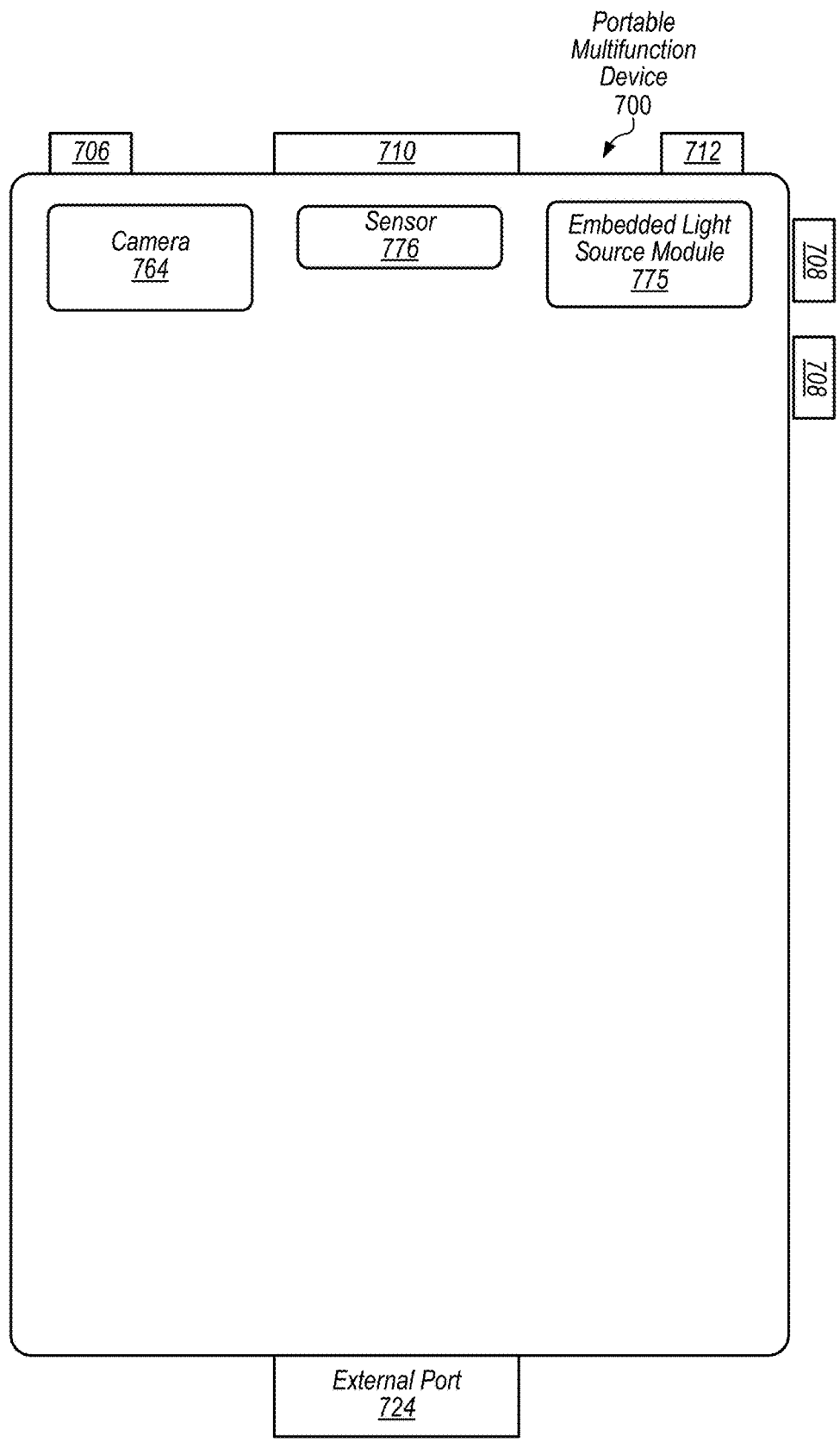
Figure 7C:
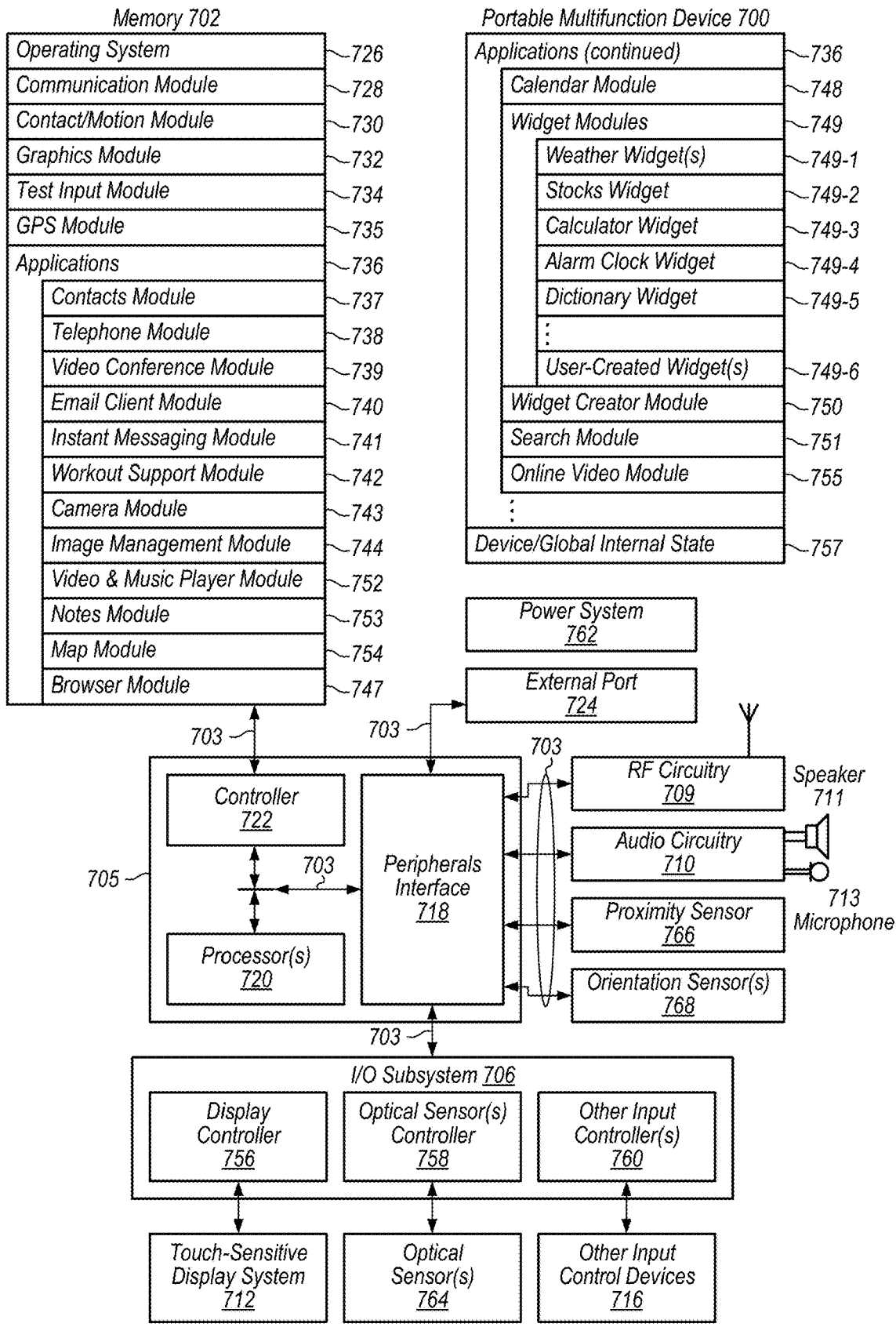

Referring to FIG. 7C, device 700 may include memory 702 (which may include one or more computer readable storage mediums), memory controller 722, one or more processing units (CPU's) 720, peripherals interface 718, RF circuitry 709, audio circuitry 710, speaker 711, touch-sensitive display system 712, microphone 713, input/output (I/O) subsystem 706, other input or control devices 716, and external port 724. Device 700 may include one or more optical sensors 764. These components may communicate over one or more communication buses or signal lines 703.

It should be appreciated that device 700 is only one example of a portable multifunction device, and that device 700 may have more or fewer components than shown, may combine two or more components, or may have a different configuration or arrangement of the components. The various components shown in FIG. 7C may be implemented in hardware, software, or a combination of hardware and software, including one or more signal processing and/or application specific integrated circuits.

Memory 702 may include high-speed random access memory and may also include non-volatile memory, such as one or more magnetic disk storage devices, flash memory devices, or other non-volatile solid-state memory devices. Access to memory 702 by other components of device 700, such as CPU 720 and the peripherals interface 718, may be controlled by memory controller 722.

Peripherals interface 718 can be used to couple input and output peripherals of the device to CPU 720 and memory 702. The one or more processors 720 run or execute various software programs and/or sets of instructions stored in memory 702 to perform various functions for device 700 and to process data.

In some embodiments, peripherals interface 718, CPU 720, and memory controller 722 may be implemented on a single chip, such as chip 705. In some other embodiments, they may be implemented on separate chips.

RF (radio frequency) circuitry 709 receives and sends RF signals, also called electromagnetic signals. RF circuitry 709 converts electrical signals to/from electromagnetic signals and communicates with communications networks and other communications devices via the electromagnetic signals. RF circuitry 709 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 709 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 710, speaker 711, and microphone 713 provide an audio interface between a user and device 700. Audio circuitry 710 receives audio data from peripherals interface 718, converts the audio data to an electrical signal, and transmits the electrical signal to speaker 711. Speaker 711 converts the electrical signal to human-audible sound waves. Audio circuitry 710 also receives electrical signals converted by microphone 713 from sound waves. Audio circuitry 710 converts the electrical signal to audio data and transmits the audio data to peripherals interface 718 for processing. Audio data may be retrieved from and/or transmitted to memory 702 and/or RF circuitry 709 by peripherals interface 718. In some embodiments, audio circuitry 710 also includes a headset jack (e.g., 712, FIG. 7A-B). The headset jack provides an interface between audio circuitry 710 and removable audio input/output peripherals, such as output-only headphones or a headset with both output (e.g., a headphone for one or both ears) and input (e.g., a microphone).

I/O subsystem 706 couples input/output peripherals on device 700, such as touch screen 712 and other input control devices 716, to peripherals interface 718. I/O subsystem 706 may include display controller 756 and one or more input controllers 760 for other input or control devices. The one or more input controllers 716 receive/send electrical signals from/to other input or control devices 716. The other input control devices 716 may include physical buttons (e.g., push buttons, rocker buttons, etc.), dials, slider switches, joysticks, click wheels, and so forth. In some alternative embodiments, input controller(s) 760 may be coupled to any (or none) of the following: a keyboard, infrared port, USB port, and a pointer device such as a mouse. The one or more buttons (e.g., 708, FIG. 7A-B) may include an up/down button for volume control of speaker 711 and/or microphone 713. The one or more buttons may include a push button (e.g., 707, FIG. 7A-B).

Touch-sensitive display 712 provides an input interface and an output interface between the device and a user. Display controller 756 receives and/or sends electrical signals from/to touch screen 712. Touch screen 712 displays visual output to the user. The visual output may include graphics, text, icons, video, and any combination thereof (collectively termed "graphics"). In some embodiments, some or all of the visual output may correspond to user-interface objects.

Touch screen 712 has a touch-sensitive surface, sensor or set of sensors that accepts input from the user based on haptic and/or tactile contact. Touch screen 712 and display controller 756 (along with any associated modules and/or sets of instructions in memory 702) detect contact (and any movement or breaking of the contact) on touch screen 712 and converts the detected contact into interaction with user-interface objects (e.g., one or more soft keys, icons, web pages or images) that are displayed on touch screen 712. In an example embodiment, a point of contact between touch screen 712 and the user corresponds to a finger of the user.

Touch screen 712 may use LCD (liquid crystal display) technology, LPD (light emitting polymer display) technology, or LED (light emitting diode) technology, although other display technologies may be used in other embodiments. Touch screen 712 and display controller 756 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 712. In an example embodiment, projected mutual capacitance sensing technology may be used.

Touch screen 712 may have a video resolution in excess of 100 dots per inch (dpi). In some embodiments, the touch screen has a video resolution of approximately 160 dpi. The user may make contact with touch screen 712 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 700 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 712 or an extension of the touch-sensitive surface formed by the touch screen.

Device 700 also includes power system 762 for powering the various components. Power system 762 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 700 may also include one or more optical sensors or cameras 764. FIG. 7C shows an optical sensor coupled to optical sensor controller 758 in I/O subsystem 706. Optical sensor 764 may include charge-coupled device (CCD) or complementary metal-oxide semiconductor (CMOS) phototransistors. Optical sensor 764 receives light from the environment, projected through one or more lens, and converts the light to data representing an image. In conjunction with imaging module 743 (also called a camera module), optical sensor 764 may capture still images or video. In some embodiments, an optical sensor is located on the back of device 700, opposite touch screen display 712 on the front of the device, so that the touch screen display may be used as a viewfinder for still and/or video image acquisition. In some embodiments, another optical sensor is located on the front of the device so that the user's image may be obtained for videoconferencing while the user views the other videoconference participants on the touch screen display.

Device 700 may also include one or more proximity sensors 766. FIG. 7C shows proximity sensor 766 coupled to peripherals interface 718. Alternatively, proximity sensor 766 may be coupled to input controller 760 in I/O subsystem 706. In some embodiments, the proximity sensor turns off and disables touch screen 712 when the multifunction device is placed near the user's ear (e.g., when the user is making a phone call).

Device 700 includes one or more orientation sensors 768. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 700. In some embodiments, the one or more orientation sensors include any combination of orientation/rotation sensors. FIG. 7C shows the one or more orientation sensors 768 coupled to peripherals interface 718. Alternatively, the one or more orientation sensors 768 may be coupled to an input controller 760 in I/O subsystem 706. In some embodiments, information is displayed on the touch screen display in a portrait view or a landscape view based on an analysis of data received from the one or more orientation sensors.

In some embodiments, the software components stored in memory 702 include operating system 726, communication module (or set of instructions) 728, contact/motion module (or set of instructions) 730, graphics module (or set of instructions) 732, text input module (or set of instructions) 734, Global Positioning System (GPS) module (or set of instructions) 735, and applications (or sets of instructions) 736. Furthermore, in some embodiments memory 702 stores device/global internal state 757. Device/global internal state 757 includes one or more of: active application state, indicating which applications, if any, are currently active; display state, indicating what applications, views or other information occupy various regions of touch screen display 712; sensor state, including information obtained from the device's various sensors and input control devices 716; and location information concerning the device's location and/or attitude.

Operating system 726 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 728 facilitates communication with other devices over one or more external ports 724 and also includes various software components for handling data received by RF circuitry 709 and/or external port 724. External port 724 (e.g., Universal Serial Bus (USB), FIREWIRE, etc.) is adapted for coupling directly to other devices or indirectly over a network (e.g., the Internet, wireless LAN, etc.).

Contact/motion module 730 may detect contact with touch screen 712 (in conjunction with display controller 756) and other touch sensitive devices (e.g., a touchpad or physical click wheel). Contact/motion module 730 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 730 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 730 and display controller 756 detect contact on a touchpad.

Contact/motion module 730 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 732 includes various known software components for rendering and displaying graphics on touch screen 712 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 732 stores data representing graphics to be used. Each graphic may be assigned a corresponding code. Graphics module 732 receives, from applications etc., one or more codes specifying graphics to be displayed along with, if necessary, coordinate data and other graphic property data, and then generates screen image data to output to display controller 756.

Text input module 734, which may be a component of graphics module 732, provides soft keyboards for entering text in various applications (e.g., contacts 737, e-mail 740, IM 741, browser 747, and any other application that needs text input).

GPS module 735 determines the location of the device and provides this information for use in various applications (e.g., to telephone 738 for use in location-based dialing, to camera module 743 as picture/video metadata, and to applications that provide location-based services such as weather widgets, local yellow page widgets, and map/navigation widgets).

Applications 736 may include the following modules (or sets of instructions), or a subset or superset thereof:
  contacts module 737 (sometimes called an address book or contact list);
  telephone module 738;
  video conferencing module 739;
  e-mail client module 740;
  instant messaging (IM) module 741;
  workout support module 742;
  camera module 743 for still and/or video images;
  image management module 744;
  browser module 747;
  calendar module 748;
  widget modules 749, which may include one or more of: weather widget 749-1, stocks widget 749-2, calculator widget 749-3, alarm clock widget 749-4, dictionary widget 749-5, and other widgets obtained by the user, as well as user-created widgets 749-6;
  widget creator module 750 for making user-created widgets 749-6;
  search module 751;
  video and music player module 752, which may be made up of a video player module and a music player module;
  notes module 753;
  map module 754; and/or
  online video module 755.

Examples of other applications 736 that may be stored in memory 702 include other word processing applications, other image editing applications, drawing applications, presentation applications, JAVA-enabled applications, encryption, digital rights management, voice recognition, and voice replication.

In conjunction with touch screen 712, display controller 756, contact module 730, graphics module 732, and text input module 734, contacts module 737 may be used to manage an address book or contact list (e.g., stored in application internal state 792 of contacts module 737 in memory 702), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 738, video conference 739, e-mail 740, or IM 741; and so forth.

In conjunction with RF circuitry 709, audio circuitry 710, speaker 711, microphone 713, touch screen 712, display controller 756, contact module 730, graphics module 732, and text input module 734, telephone module 738 may be used to enter a sequence of characters corresponding to a telephone number, access one or more telephone numbers in address book 737, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 709, audio circuitry 710, speaker 711, microphone 713, touch screen 712, display controller 756, optical sensor 764, optical sensor controller 758, contact module 730, graphics module 732, text input module 734, contact list 737, and telephone module 738, videoconferencing module 739 includes executable instructions to initiate, conduct, and terminate a video conference between a user and one or more other participants in accordance with user instructions.

In conjunction with RF circuitry 709, touch screen 712, display controller 756, contact module 730, graphics module 732, and text input module 734, e-mail client module 740 includes executable instructions to create, send, receive, and manage e-mail in response to user instructions. In conjunction with image management module 744, e-mail client module 740 makes it very easy to create and send e-mails with still or video images taken with camera module 743.

In conjunction with RF circuitry 709, touch screen 712, display controller 756, contact module 730, graphics module 732, and text input module 734, the instant messaging module 741 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 709, touch screen 712, display controller 756, contact module 730, graphics module 732, text input module 734, GPS module 735, map module 754, and music player module 746, workout support module 742 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 712, display controller 756, optical sensor(s) 764, optical sensor controller 758, embedded light source module 775, sensor 776, contact module 730, graphics module 732, and image management module 744, camera module 743 includes executable instructions to capture still images or video (including a video stream) and store them into memory 702, modify characteristics of a still image or video, or delete a still image or video from memory 702.

In conjunction with touch screen 712, display controller 756, contact module 730, graphics module 732, text input module 734, embedded light source module 775, sensor 776, and camera module 743, image management module 744 includes executable instructions to arrange, modify (e.g., edit), or otherwise manipulate, label, delete, present (e.g., in a digital slide show or album), and store still and/or video images.

In conjunction with RF circuitry 709, touch screen 712, display system controller 756, contact module 730, graphics module 732, and text input module 734, browser module 747 includes executable instructions to browse the Internet in accordance with user instructions, including searching, linking to, receiving, and displaying web pages or portions thereof, as well as attachments and other files linked to web pages.

In conjunction with RF circuitry 709, touch screen 712, display system controller 756, contact module 730, graphics module 732, text input module 734, e-mail client module 740, and browser module 747, calendar module 748 includes executable instructions to create, display, modify, and store calendars and data associated with calendars (e.g., calendar entries, to do lists, etc.) in accordance with user instructions.

In conjunction with RF circuitry 709, touch screen 712, display system controller 756, contact module 730, graphics module 732, text input module 734, and browser module 747, widget modules 749 are mini-applications that may be downloaded and used by a user (e.g., weather widget 749-1, stocks widget 749-2, calculator widget 7493, alarm clock widget 749-4, and dictionary widget 749-5) or created by the user (e.g., user-created widget 749-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 709, touch screen 712, display system controller 756, contact module 730, graphics module 732, text input module 734, and browser module 747, the widget creator module 750 may be used by a user to create widgets (e.g., turning a user-specified portion of a web page into a widget).

In conjunction with touch screen 712, display system controller 756, contact module 730, graphics module 732, and text input module 734, search module 751 includes executable instructions to search for text, music, sound, image, video, and/or other files in memory 702 that match one or more search criteria (e.g., one or more user-specified search terms) in accordance with user instructions.

In conjunction with touch screen 712, display system controller 756, contact module 730, graphics module 732, audio circuitry 710, speaker 711, RF circuitry 709, and browser module 747, video and music player module 752 includes executable instructions that allow the user to download and play back recorded music and other sound files stored in one or more file formats, such as MP3 or AAC files, and executable instructions to display, present or otherwise play back videos (e.g., on touch screen 712 or on an external, connected display via external port 724). In some embodiments, device 700 may include the functionality of an MP3 player.

In conjunction with touch screen 712, display controller 756, contact module 730, graphics module 732, and text input module 734, notes module 753 includes executable instructions to create and manage notes, to do lists, and the like in accordance with user instructions.

In conjunction with RF circuitry 709, touch screen 712, display system controller 756, contact module 730, graphics module 732, text input module 734, GPS module 735, and browser module 747, map module 754 may be used to receive, display, modify, and store maps and data associated with maps (e.g., driving directions; data on stores and other points of interest at or near a particular location; and other location-based data) in accordance with user instructions.

In conjunction with touch screen 712, display system controller 756, contact module 730, graphics module 732, audio circuitry 710, speaker 711, RF circuitry 709, text input module 734, e-mail client module 740, and browser module 747, online video module 755 includes instructions that allow the user to access, browse, receive (e.g., by streaming and/or download), play back (e.g., on the touch screen or on an external, connected display via external port 724), send an e-mail with a link to a particular online video, and otherwise manage online videos in one or more file formats, such as H.264. In some embodiments, instant messaging module 741, rather than e-mail client module 740, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 702 may store a subset of the modules and data structures identified above. Furthermore, memory 702 may store additional modules and data structures not described above.

In some embodiments, device 700 is a device where operation of a predefined set of functions on the device is performed exclusively through a touch screen and/or a touchpad. By using a touch screen and/or a touchpad as the primary input control device for operation of device 700, the number of physical input control devices (such as push buttons, dials, and the like) on device 700 may be reduced.

The predefined set of functions that may be performed exclusively through a touch screen and/or a touchpad include navigation between user interfaces. In some embodiments, the touchpad, when touched by the user, navigates device 700 to a main, home, or root menu from any user interface that may be displayed on device 700. In such embodiments, the touchpad may be referred to as a "menu button." In some other embodiments, the menu button may be a physical push button or other physical input control device instead of a touchpad.

FIG. 7A-B illustrates a portable multifunction device 700 having a touch screen 712 in accordance with some embodiments. The touch screen may display one or more graphics within a user interface (UI). In this embodiment, as well as others described below, a user may select one or more of the graphics by making a gesture on the graphics, for example, with one or more fingers 701 (not drawn to scale in the Figure) or one or more styluses 715 (not drawn to scale in the figure).

Device 700 may also include one or more physical buttons, such as "home" or menu button 704. As described previously, menu button 704 may be used to navigate to any application 736 in a set of applications that may be executed on device 700. Alternatively, in some embodiments, the menu button is implemented as a soft key in a graphics user interface (GUI) displayed on touch screen 712.

In one embodiment, device 700 includes touch screen 712, menu button 704, push button 707 for powering the device on/off and locking the device, volume adjustment button(s) 708, Subscriber Identity Module (SIM) card slot 710, head set jack 712, and docking/charging external port 724. Push button 707 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 700 also may accept verbal input for activation or deactivation of some functions through microphone 713.

It should be noted that, although many of the examples herein are given with reference to optical sensor/camera 764 (on the front of a device), a rear-facing camera or optical sensor that is pointed opposite from the display may be used instead of or in addition to an optical sensor/camera 764 on the front of a device.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A mobile computing device, comprising:
an image sensor configured to capture image data for a field of view;
a light source module embedded in the mobile computing device, the light source module comprising:
a first Fresnel lens comprising a plurality of different zones, wherein a first one of the different zones is a first asymmetric zone that is radially asymmetric, and wherein the first asymmetric zone is configured to redirect light received from a first illumination element to at least a portion of a field of view for an image sensor;
the first illumination element located within respective focal lengths of the different zones of the Fresnel lens and configured to emit light; and
a controller configured to cause the first illumination element to emit light that passes through the first Fresnel lens.

2. The mobile computing device of claim 1, wherein the radial asymmetry of the first asymmetric zone comprises a sinusoidal pattern that varies an angle of a surface within the asymmetric zone along at least a portion of a circumference around a center of the first Fresnel lens.

3. The mobile computing device of claim 1, wherein a second one of the zones is a second asymmetric zone that is radially asymmetric, wherein the second asymmetric zone is configured to redirect light received from the illumination element to a different portion of the field of view for the image sensor.

4. The mobile computing device of claim 1, wherein the light source module further comprises:
a second Fresnel lens comprising a second plurality of different zones, wherein a first one of the second plurality of different zones is a second asymmetric zone that is radially asymmetric, wherein the second asymmetric zone is configured to redirect light received from a second illumination element to at least another portion of the field of view for the image sensor; and
the second illumination element located within respective focal lengths of the second plurality of different zones of the second Fresnel lens and configured to emit light.

5. The mobile computing device of claim 4, wherein a shape of the first illumination element is different than a shape of the second illumination element.

6. A light source module, comprising:
a first Fresnel lens comprising a plurality of different zones, wherein a first one of the different zones is first asymmetric zone that is radially asymmetric, and wherein the first asymmetric zone is configured to redirect light received from a first illumination element to at least a portion of a field of view for an image sensor; and
the first illumination element configured to emit light, wherein the illumination element is located within respective focal lengths of the plurality of different zones of the Fresnel lens.

7. The light source module of claim 6, wherein the first asymmetric zone redirects the light to provide inverted illumination at the portion of the field of view.

8. The light source module of claim 6, wherein the first asymmetric zone redirects the light to provide non-inverted illumination at the portion of the field of view.

9. The light source module of claim 6, wherein the radial asymmetry of the first asymmetric zone comprises an angle for a surface of the first asymmetric zone that is different at different cross sections of the Fresnel lens.

10. The light source module of claim 6, wherein the radial asymmetry of the first asymmetric zone comprises a surface radius of the first asymmetric zone that is different at different cross sections of the Fresnel lens.

11. The light source module of claim 6, wherein a second one of the zones is a second asymmetric zone that is radially asymmetric and wherein the radial asymmetry of the second asymmetric zone is different from the radial asymmetry of the first asymmetric zone.

12. The light source module of claim 6, wherein the first illumination element is a square shape.

13. The light source module of claim 6, wherein the first illumination element is a non-square shape.

14. The light source module of claim 6, further comprising:
a second Fresnel lens comprising a second plurality of different zones, wherein a first one of the second plurality of different zones is a second asymmetric zone that is radially asymmetric, wherein the second asymmetric zone is configured to redirect light received from a second illumination element to at least another portion of the field of view for the image sensor; and
the second illumination element located within respective focal lengths of the second plurality of different zones of the second Fresnel lens configured to emit light.

15. The light source module of claim 14, wherein the radial asymmetry of the second asymmetric zone of the second Fresnel lens is different than the radial asymmetry of the first asymmetric zone of the first Fresnel lens, and wherein a shape of the illumination element is different than a shape of the other illumination element.

16. A Fresnel lens comprising a plurality of different zones, wherein at least one of the different zones comprises a radially asymmetric sub-zone such that a surface radius of the radially asymmetric subzone is different at different locations along a circumference around a center of the Fresnel lens, and wherein the asymmetric sub-zone is configured to direct light received from a light source to at least a portion of a field of view for an image sensor.

17. The Fresnel lens of claim 16, wherein the asymmetric sub-zone redirects the light to provide inverted illumination at the portion of the field of view.

18. The Fresnel lens of claim 16, wherein the radial asymmetry of the asymmetric sub-zone comprises an angle for a surface of the asymmetric sub-zone that is different at different cross sections of the Fresnel lens.

19. The Fresnel lens of claim 16, wherein the different locations are at different cross sections of the Fresnel lens.

20. The Fresnel lens of claim 16, wherein the at least one zone comprises a radially symmetric sub-zone that is adjacent to the radially asymmetric sub-zone.

* * * * *